United States Patent Office 3,054,805
Patented Sept. 18, 1962

---

3,054,805
PROCESS FOR PREPARING ISOMALTOL
John E. Hodge and Earl C. Nelson, Peoria, Ill., assignors to the United States of America as represented by the Secretary of Agriculture
No Drawing. Original application Dec. 10, 1959, Ser. No. 858,837, now Patent No. 3,015,654, dated Jan. 2, 1962. Divided and this application Aug. 16, 1961, Ser. No. 131,940
2 Claims. (Cl. 260—345.9)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This is a division of applicants' copending application, S.N. 858,837, filed December 10, 1959, now Patent No. 3,015,654.

This invention pertains to a method for preparing the known compound, isomaltol (Backe: Comptes Rendus 150: 540–543 (1910) and ibid 151: 78–80 (1910)).

This invention further relates to the preparation of a new compound, O-galactosylisomaltol.

Maltol, discovered by Brand in roasted malt, is commercially available. It has a marked caramel-butterscotch aroma and flavor and accordingly is employed in confectionary products, pastries and related bakery products, fruit flavors, and in other foodstuffs where a caramel-like and fruity flavor is desired.

Isomaltol was discovered by Backe, supra, who obtained it in micro quantities by acidic extractive distillation of breads made of wheat flour. It possesses a caramel-like, somewhat fruity flavor very similar to that of maltol. However, it melts at 102° C. rather than at 162° C. and is considerably more volatile than maltol. Accordingly, it would be preferred for many applications if it became available at a comparable price.

Our novel compound, O-galactosylisomaltol, is an O-glycoside in which D-galactose is linked to the isomaltol aglycone through the strongly acidic enolic hydroxyl group of the latter. We believe that O-galactosylisomaltol has the following structure:

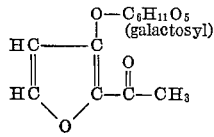

Our new method or process for the preparation of isomaltol in favorable yields involves the discovery that we can synthesize the novel intermediate compound O-galactosylisomaltol, which readily hydrolyzes in the presence of acid or alkali or under the influence of heat and moisture to liberate isomaltol and galactose. It is obvious that it would not be necessary to split the O-galactosylisomaltol and isolate the isomaltol for flavor use in pastries, baked goods, boiled candies, etc. (and especially those containing a hydrolysis-promoting acid such as citric or tartaric) since the galactoside is hydrolyzed to the flavorful isomaltol and the harmless galactose by the heat and steam present during the cooking or baking process.

Our invention comprises the discovery that we can synthesize our novel intermediate, namely O-galactosylisomaltol by reacting milk sugar, such as α-lactose hydrate or other source of lactose, with the salt of a strongly basic secondary amine ($K_B > 10^{-8}$ in water) such as piperidine acetate, piperidine dihydrogen phosphate, morpholine acetate, dimethylamine acetate, diethylamine formate, or diethanolamine phosphate in an inert solvent medium such as methanol, ethanol, isopropanol, or dimethylformamide, and in the further presence of a non-reactant tertiary amine buffer such as trimethylamine, triethylamine, triethanolamine, N-methylmorpholine, pyridine, and mixed pyridine bases (isomeric picolines) or a sterically hindered non-reactant secondary amine such as di-isopropylamine, dicyclohexylamine, and 2,6-dimethylpiperidine at a reaction temperature in the range 60 to 100° C. for from 10 to 24 hours. At the end of the reaction period O-galactosylisomaltol is crystallized and recovered from the reaction mixture by filtration.

Isolation of the O-galactosylisomaltol would not be necessary in a commercial process for preparing isomaltol. As is shown by the examples, the reaction mixture can be acidified and then steam distilled or acidified, heated, and solvent-extracted with benzene, chlorinated hydrocarbons, ethers, esters, ketones, hydrocarbons, or higher alcohols to obtain the isomaltol by evaporation of the solvent.

The amine salt reactant of our invention is basic, neutral, or weakly acidic; it is not strongly acidic. Because it can be recovered from the reaction mixture unchanged, it acts in a catalytic manner and therefore the amount used is not critical. However, we prefer to use from one-half to two moles of amine salt for each mole of lactose in the reaction mixture to obtain reasonable reaction times in the temperature range of 60 to 100° C. We need not add amine salt as such to the reaction mixture; ordinarily we add the basic secondary amine and the salt-forming acid separately in the desired ratio. Furthermore, because organic acids are generated as byproducts in the reaction mixture as the desired reaction proceeds, it is not necessary to add a full mole of the salt-forming acid for each mole of secondary amine reactant.

The inert solvent is not necessary for the synthesis of O-galactosylisomaltol. We have conducted the reaction in non-reactant tertiary amine media without the addition of further solvent. However, use of an alcoholic solvent allows cleaner and easier separation of O-galactosylisomaltol from byproducts in the reaction mixture and allows the selection and fixing of a nearly constant reaction temperature by boiling and refluxing the properly selected solvent.

The presence of non-reactant tertiary amine or non-reactant sterically hindered secondary amine is not necessary for the synthesis of O-galactosylisomaltol. We have conducted the synthesis successfully in alcoholic media and in dimethylformamide without the use of non-reactant amine buffer. However, when it is desired to recover O-galactosylisomaltol, we prefer to add to the reaction mixture an amount of tertiary amine or non-reactant secondary amine that will keep the reaction mixture weakly basic throughout the heating period to thereby prevent hydrolysis and loss of O-galactosylisomaltol. When it is desired to recover isomaltol from the reaction mixture, for example, by acidification and steam distillation, the amine buffer need not be used.

An O-glucosylisomaltol was not found using maltose hydrate in place of α-lactose hydrate under the conditions outlined in the examples, but it is apparent that β-lactose hydrate, anhydrous β-lactose, anhydrous α-lactose, and other sources of lactose such as dried whey and dried skim milk would be operative.

The following examples are presented to further teach the practice of our invention.

*Example 1*

In a 2-liter, 3-necked reaction flask, fitted with a motor-driven anchor-bladed stirrer, thermometer, and reflux condenser, 360 g. (1 mole) of α-lactose hydrate, 85 g. (1 mole) of piperidine, 60 g. (1 mole) of glacial acetic acid, 100 ml. of triethylamine, and 300 ml. of absolute ethanol were heated and stirred at a constant temperature of 75° C. The last of the solids disolved between 10 and 12 hours of heating. After 15 hours of heating the reaction product was present and was isolated in 28 percent of the theoretical yield in a separate experiment. After 24 hours of heating at 75° C., 300 ml. of absolute ethanol was added; then the dark brown reaction mixture was continually stirred for one hour while the flask was cooled in an ice-water bath to crystallize the product. The precipitate was filtered off with suction, washed several times with ethanol until nearly white, and dried in a vacuum desiccator over anhydrous calcium chloride to a constant weight of 106 g. (37 percent of theory); melting point, 204–205° C. Recrystallization from hot water or aqueous alcohol with the use of decolorizing charcoal gave pure white crystals of the same melting point, and with a specific optical rotation of −4.5° for a 2 percent solution in water with sodium light. Analyses gave 50.18 percent carbon, 5.65 percent hydrogen. Calculated for $C_{12}H_{16}O_8$: 50.00 percent carbon, 5.60 percent hydrogen.

Acid hydrolysis or acid hydrogenolysis of the neutral compound, $C_{12}H_{16}O_8$, gave crystalline α-D-galactose, $C_6H_{12}O_6$, M.P. 165–167°, identified by its optical rotation in water and by its conversion by nitric acid to crystalline mucic acid, M.P. 213–214°. Methanolysis in anhydrous methanol-hydrogen chloride gave the known methyl β-D-galactopyranoside, $C_7H_{14}O_6$, M.P. 177–178°, no optical rotation in water; found: 43.30 percent carbon, 7.33 percent hydrogen. Calculated for $C_7H_{14}O_6$: 43.30 percent carbon, 7.28 percent hydrogen.

When the acid hydrolysate of the neutral compound, $C_{12}H_{16}O_8$ was extracted with ether and the ether extracts concentrated by evaporation, a colorless acidic compound was crystallized. Recrystallized and sublimed, the acidic compound melted at 100–101° C. By titration with standard base, the neutral equivalent was 124. Found: 57.18 percent carbon, 4.80 percent hydrogen. Calculated for $C_6H_6O_3$: 126.1 molecular weight, 57.14 percent carbon, 4.80 percent hydrogen. This same compound was sublimed and distilled from the neutral $C_{12}H_{16}O_8$ compound when it was heated to 205° and caramelized. It was identified as "isomaltol," by converting it to the O-methyl ether (M.P. 101–103°), the O-benzoyl ester (M.P. 100–101°), and the same green copper salt reported in the literature. Moreover, the stable violet color with ferric chloride, the acidity, the volatility, the solubilities, and the reducing action toward Fehling solution conformed exactly to the literature reports.

Example 2

In the same apparatus described in Example 1, precooled to 1° C., the following were added in the order given: 500 ml. absolute methanol, 48 g. (1.06 moles) of anhydrous dimethylamine, 100 g. trimethylamine, 360 g. (1.00 mole) of α-lactose hydrate, and 60 g. (1.00 mole) of glacial acetic acid was slowly dropped in with stirring. The mixture was then continually stirred and heated under reflux at its boiling point for 24 hours. The temperature increased from 60° (1 hour) to 67° (2 hours) to 68° (10 hours) to 71° (20 hours) and to 72° C. at 24 hours. The reaction flask was cooled to 2° C. and held at this temperature for one hour until crystallization of the product was essentially complete. Isolated as described in Example 1, this first crop weighed 60.5 g.

The filtrate and washings were reheated at a constant reflux temperature of 77±1° C. for 8 hours. After removing the solvents by distillation at atmospheric pressure over 2 additional hours, the dark solution was again cooled to 1° C. and a second crop, isolated in the same way as the first, weighed 3 g.

Both crops were identical, M.P. 204–205°, representing the same compound, $C_{12}H_{16}O_8$, as was obtained in Example 1. The total yield in this experiment was 63.5 g., 22 percent of the theoretical amount.

Example 3

The reaction described in Example 1 was repeated with 87 g. of morpholine (1 mole) in place of 85 g. of piperidine, except that the reaction mixture was refluxed at its natural boiling point of 82° C. for 24 hours. The same compound, O-galactosylisomaltol, $C_{12}H_{16}O_8$, was isolated, 59.2 g. (21 percent of theory). The filtrate from the reaction mixture was reheated at the boiling point, 82–83°, for 24 hours longer to produce 15.4 g. additional O-galactosylisomaltol. Total yield, 74.6 g. (26 percent of theory).

Example 4

Thirteen grams of crude O-galactosylisomaltol, $$C_{12}H_{16}O_8$$

was suspended in 100 ml. of water and 100 ml. of 4-molar orthophosphoric acid was added. The 2-molar acidic solution was steam-distilled until 900 ml. of aqueous distillate was collected, and a violet color was no longer obtained from drops of the distillate upon addition of ferric chloride. The distillate was extracted three times with 200 ml. portions of chloroform. The chloroform layers were separated, combined, dried over anhydrous sodium sulfate, and then distilled at atmospheric pressure. The crystalline residue in the distilling flask was washed out with cold water and dried in air to a constant weight of 2.3 g. (40 percent of the theoretical amount of isomaltol from 13 g. of O-galactosylisomaltol). When purified by recrystallization from benzene, the compound was identical in all properties with the isomaltol isolated by ether extraction of an acid hydrolysate of O-galactosylisomaltol (Example 1).

Example 5

Forty grams of O-galactosylisomaltol, $C_{12}H_{16}O_8$, was placed in a 250 ml. alembic flask which was then lowered into a Woods metal bath preheated to 230° C. Distillation began with liquefaction and caramelization of the O-galactosylisomaltol within 3 minutes and continued at atmospheric pressure for 10 minutes as the bath temperature was held in the range 245–260° C. The liquid distillate of strong, fragrant aromatic odor, immediately crystallized in the receiver. Yield, 14 g. The crystalline distillate was broken up under water at room temperature and cooled to 1° C. before filtering and re-washing with ice-water. After drying over anhydrous calcium chloride at atmospheric pressure, the yield of pure compound was 12 g. (68 percent of theory); M.P. 101–102°, unchanged upon recrystallization from water or ether. This compound was identical with isomaltol obtained in Example 1.

Example 6

Anhydrous dimethylamine, 23 g. (0.5 mole), was dissolved in 300 ml. of dimethylformamide, and 180 g. (0.5 mole) of α-lactose hydrate was added. While cooling the mixture at 0° C., 30 g. (0.5 mole) of glacial acetic acid was slowly added; then the mixture was heated at 90° C. under reflux for 12 hours. After concentration of the dark solution under vacuum at 90°, 18–20 mm. mercury pressure, for 3 hours to remove most of the solvent, the warm sirupy residue was diluted with 300 ml. of hot, absolute ethanol. A small amount of insoluble, dark, melanoidin-like substance was filtered off. The filtrate, upon cooling and seeding, gave 14 g.; and, after vacuum concentration of the second filtrate, 12 g. more of O-galactosylisomaltol, M.P. 204–5°. The total yield is 18 percent of the theoretical amount.

Example 7

Nine grams of O-galacetosylisomaltol, dissolved in 800 ml. of 1.5 percent sodium carbonate solution, was heated at 85–90° C. for 30 minutes. The red solution was then allowed to stand at 25° C. for two days before it was acidified with 100 ml. of 4-molar orthophosphoric acid and extracted twice with 250 ml. portions of ether. The combined ether extracts were dried over anhydrous sodium sulfate and distilled to yield 1 g. of crystalline isomaltol (25 percent of theory); M.P. 99–101°.

*Example 8*

A pie crust dough consisting of 62.5 gm. flour, 36 gm. hydrogenated vegetable oil shortening, 15 ml. cold water, and 0.3125 gm. O-galactosylisomaltol (0.5 percent based on the weight of the flour) was rolled to a thickness of ⅛ inch and baked for 8 minutes at 500° F. A taste panel preferred this pie crust over one identically prepared except that it did not contain O-galactosylisomaltol.

Having disclosed our invention, we claim:

1. The method of recovering pure isomaltol comprising pyrolyzing O-galactosylisomaltol at a temperature of about from 245–260° C. in the absence of added moisture to liberate isomaltol, and recovering the isomaltol.

2. The method of recovering pure isomaltol comprising subjecting O-galactosylisomaltol to alkali hydrolysis to liberate isomaltol, extracting the isomaltol with an organic solvent, and recovering pure isomaltol from the resulting extract.

No references cited.